United States Patent
Lender

[15] 3,661,042
[45] May 9, 1972

[54] CENTERING MECHANISM FOR MACHINE TOOLS

[72] Inventor: Chester A. Lender, Rockford, Ill.
[73] Assignee: Slick Electro Inc., Rockford, Ill.
[22] Filed: July 2, 1970
[21] Appl. No.: 51,853

[52] U.S. Cl............................................82/3, 82/31, 29/37
[51] Int. Cl..........................................................B23b 9/04
[58] Field of Search..........................82/31, 3; 29/565, 37

[56] References Cited

UNITED STATES PATENTS

| | | | |
|---|---|---|---|
| 1,512,381 | 10/1924 | Turcott | 82/3 |
| 3,198,042 | 8/1965 | Binns | 82/31 |
| 1,821,331 | 9/1931 | Svenson | 82/31 |
| 2,910,905 | 11/1959 | Gamet | 82/31 |
| 3,180,188 | 4/1965 | Brown | 82/3 |

Primary Examiner—Leonidas Vlachos
Attorney—Wolfe, Hubbard, Leydig, Voit & Osann

[57] ABSTRACT

A machine tool, such as an automatic screw machine, having a centering device which is mounted on a tool head and engages the end of a workpiece held by a rotating spindle on a work head as the tool head moves toward the work head. After engagement, the movement of the tool head continues and the centering device slides back relative to the tool head. Pressure fluid under the control of a pressure regulator acts on a piston which holds the centering device against the workpiece. The regulator maintains a constant pressure so that the force with which the centering device engages the workpiece also remains constant.

5 Claims, 5 Drawing Figures

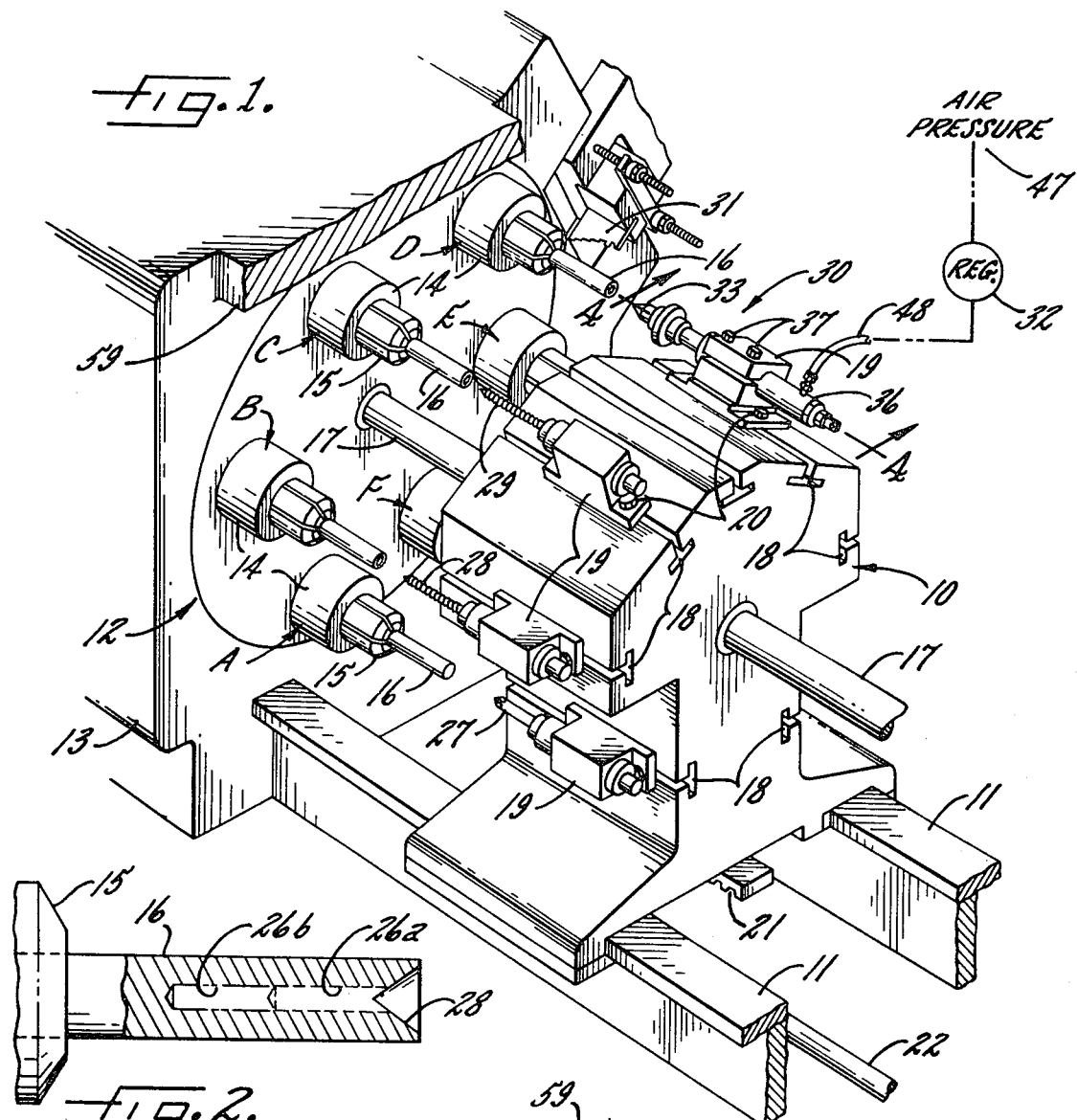
Fig. 1.
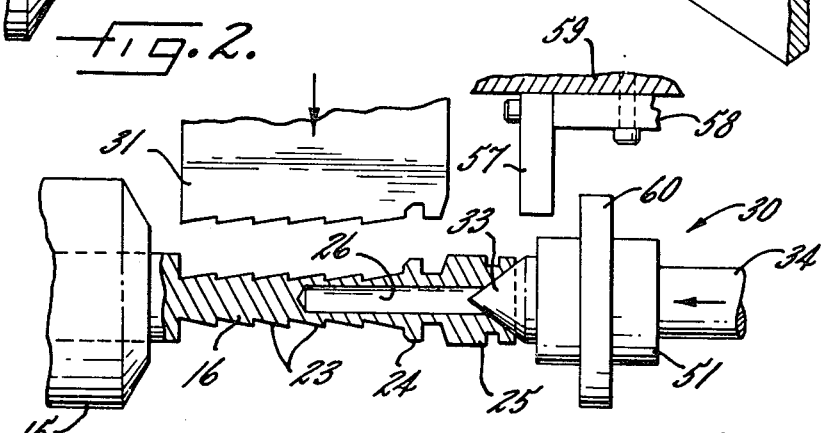
Fig. 2.
Fig. 3.
INVENTOR.
CHESTER A. LENDER,
BY
Wolfe, Hubbard, Leydig, Voit & Osann
ATTORNEYS.

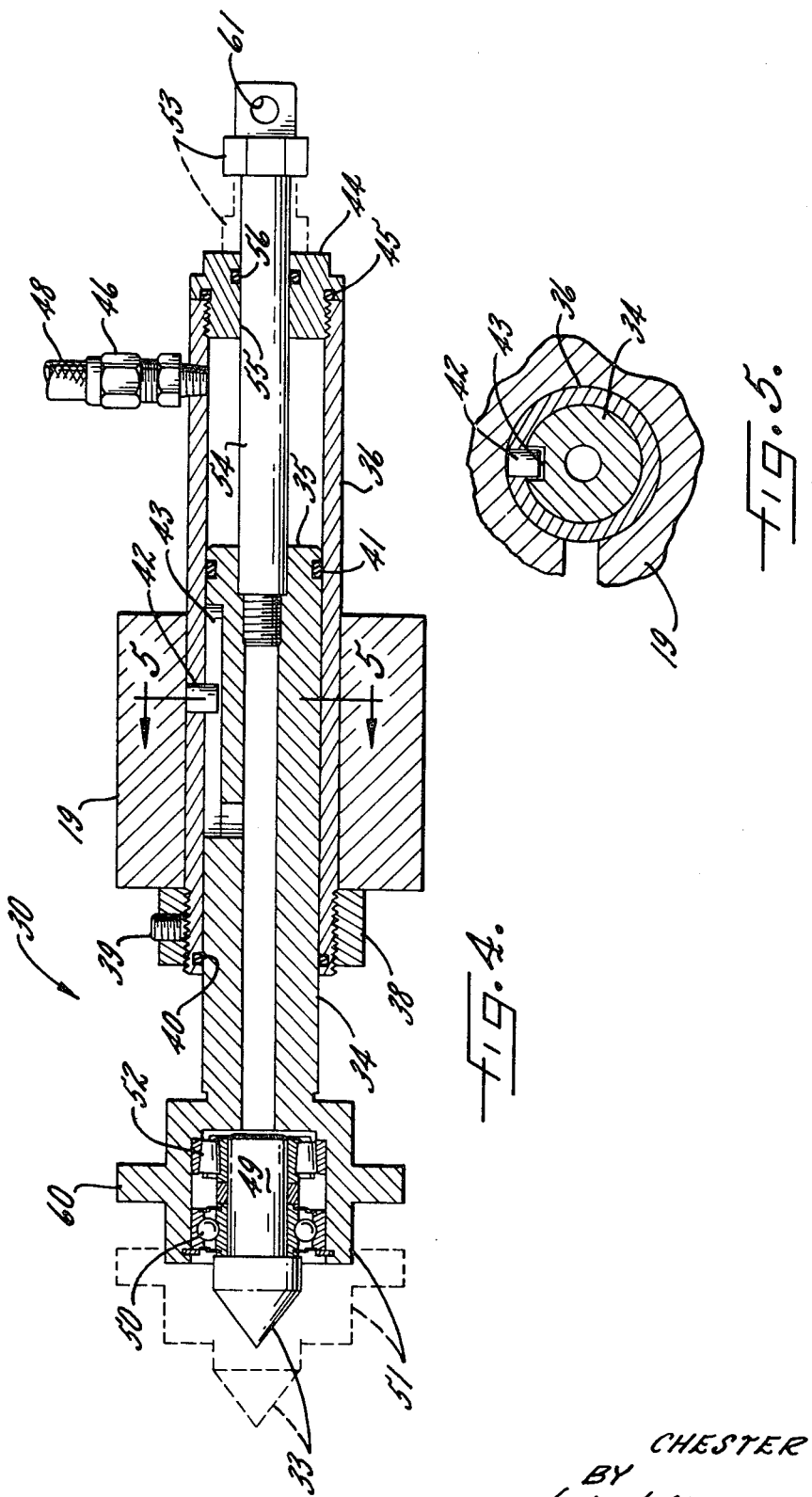

3,661,042

CENTERING MECHANISM FOR MACHINE TOOLS

BACKGROUND OF THE INVENTION

This invention relates to machine tools and, more particularly, to automatic screw machines in which a plurality of workpieces are worked upon simultaneously. Customarily, the workpieces are held by rotating spindles on an indexable work head and the tools for operating on the workpieces are mounted on a tool head which is fed toward the work head. Some of the tools usually perform operations such as drilling and threading and these operations are performed continuously as the tool head is fed toward the work head. In some instances, it is desirable to perform a turning operation on one or more of the workpieces in which case the end of that workpiece is engaged by a centering device carried by the tool head and the turning then is performed by a separately mounted tool. Once the centering device engages the workpiece, the tool head continues its movement but the centering device remains stationary, that is, it moves back relative to the tool head.

SUMMARY OF THE INVENTION

The general object of the present invention is to provide a novel centering device which engages the workpiece with a substantially constant pressure throughout the feeding movement of the tool head.

A more detailed object is to accomplish the foregoing by using a pressure fluid to urge the centering device against the workpiece and controlling the pressure of the fluid by a pressure regulator so that this pressure is substantially constant.

BRIEF DESCRIPTION OF THE DRAWINGS

FIG. 1 is a fragmentary perspective view of an automatic screw machine utilizing the novel centering mechanism of the present invention.

FIG. 2 is an enlarged fragmentary view of a partially formed workpiece, portions of the workpiece being broken away and shown in section.

FIG. 3 is an enlarged fragmentary view of the portion of the machine utilizing the centering mechanism, the workpiece being shown in section.

FIG. 4 is an enlarged sectional view taken along the line 4—4 in FIG. 1.

FIG. 5 is a fragmentary sectional view taken along the line 5—5 in FIG. 4.

DETAILED DESCRIPTION OF THE PREFERRED EMBODIMENT

As shown in the drawings for purposes of illustration, the invention is embodied in an automatic screw machine having a tool head 10 which is slidable horizontally on ways 11 toward and away from a work-supporting head 12 rotatable in a housing 13. As is customary with such machines, the work head includes a plurality of spindles 14, in this case six, which are angularly spaced around the head at equal distances and are progressively indexed to stations A, B, C, D, E and F. Each spindle 14 includes a chuck 15 which holds the work 16 which is in the form of cylindrical bar stock. Through conventional mechanism (not shown), the work head 12 periodically is turned or indexed to advance each spindle 14 and the associated workpiece to the next station and then the head dwells while various machining operations are performed on the workpieces. On such a machine, these operations require relative rotation of the tools and the work, examples being drilling, turning and the like, and, for this purpose, the spindles 14 are turned about their axes through a well-known mechanism (not shown) by a drive shaft 17 which is journaled in and passes through the tool head 10.

The tool head 10 carries various operating mechanisms, each of which acts on a workpiece at one of the stations A through F. For this purpose, the tool head is formed with six axially extending slots 18 of T-shape cross section, the location of the slots being correlated with the stations on the work head 12. As is well-known in the art, holders 19 having portions (not shown) received in the slots are located longitudinally in their respective slots and then are clamped in place to the tool head by bolts 20. The holders receive the various operating mechanisms which act on the workpieces each time the tool head is moved toward the work head by a rack 21 driven by a shaft 22 through suitable gearing (not shown). After the operations have been performed, the tool head is retracted and the work head is indexed.

The workpiece 16 shown here by way of example is a connector for a flexible conduit or hose and is illustrated in a partially completed condition in FIGS. 2 and 3. It includes, in general, a serrated section 23 for receiving the conduit, a circular flange 24, and a connection portion 25. Also, the workpiece is formed with a bore 26 which extends throughout the length of the workpiece when the latter is completed. In the present instance, a tool 27 first forms a conical chamfer 28 (FIG. 2) on the end of the workpiece at the station A. At the station B, a drill 28 forms about one-third of the bore 26, that is, the portion 26a in FIG. 26a while the next one-third 26b is formed by a drill 29 at the station C. At the station D, the free end of the workpiece is engaged by a center 30 which is held by one of the holders 19 and a forming tool 31 disposed alongside this station is fed radially into the work to give the desired exterior configuration to the workpiece. A third drill (not shown) completes the bore 26 at the station E and the finished workpiece is cut off at the station F by a suitable tool (not shown).

It will be appreciated that the movement of the tool head 10 toward the work head 12 is a feeding motion so that tools such as the drills 28 and 29 engage the work and perform their drilling operations as the tool head continues to move toward the work head. At about the time the drills engage the work, the center 30 enters the chamfer 28. Thereafter, however, the center does not move further even though the tool head continues to move. Instead, the center slides back within its holder 19 while being urged against the end of the work to keep the work centered while the latter is being cut by the forming tool 31.

In prior arrangements, resilient mechanical means such as a spring was used to hold the center 30 against the workpiece as the center moved back within its holder 19. With comparatively small workpieces, however, the center did not keep the workpieces accurately centered and it was impossible to form satisfactory workpieces of this type. I have discovered that the reason for this was due to the changing or increasing force exerted by the spring as the tool head moved forward. If a spring was selected to exert a proper force at the beginning of the stroke of the tool head, the force was so great toward the end of the stroke as to cause the work to shift off center. On the other hand, if the selected spring exerted an acceptable force in the latter part of the stroke, the force was too light at the beginning of the stroke to keep the work centered.

Based upon this discovery, the present invention contemplates the provision of means for applying a constant, selected force on the center throughout the stroke of the tool head 10. To this end, the center 30 is urged against workpiece 16 by pressure fluid, preferably air, which is maintained at a selected pressure by a regulator 32. In the preferred form of the invention, the conical centering member or point 33 of the center 30 is carried on the outer end of the rod 34 of a piston 35 (FIG. 4) which slides in a cylinder 36 and pressurized air under the control of the regulator 32 is admitted to the head end of the cylinder.

Herein, the cylinder 36 is inserted in its holder 19 and clamped by the bolts 37. To maintain the axial position of the cylinder, a collar 38 (FIG. 4) is threaded on the rod end of the cylinder and abuts the holder, the collar being held in place on the cylinder by a set screw 39. The rod 34 slides in the cylinder and the inner end portion of the rod constitutes the piston 35, O-rings 40 and 41 forming seals between the rod and the cylinder. The rod 34 is held against turning relative to the cylinder 36 by a pin 42 fixed to the cylinder and projecting into a longitudinal slot 43 in the periphery of the rod. The head end of the cylinder is closed by a plug 44 threaded into the cylinder and sealed by an O-ring 45. Adjacent the plug, a hose connector 46 is threaded into the cylinder to connect the interior of the cylinder with the source 47 (FIG. 1) of pressurized air through a hose 48 and the pressure regulator 32. The latter may be a conventional pressure regulating valve and preferably is of the type that may be set manually to produce selected pressures.

In the present instance, the centering member 30 includes the conical tip 33 and a reduced shank portion 49 which is journaled by means of a ball bearing 50 in a hollow enlargement 51 on the outer end of the rod 34. Thrust resulting from the tip 33 pressing against the end of the workpiece is taken up by the bearing 52 also disposed within the enlargement 51.

Means is provided for normally limiting the forward stroke of the rod 34 and hence the member 33 to the position shown in broken lines in FIG. 4. In this position, the pin 42 is spaced from the end of the slot 43. This means comprises an enlarged head 53 on the end of a rod 54 which projects through a bore 55 in the plug 44, being sealed by an O-ring 56, and threaded into the end of the rod 34. Thus, as shown in broken lines, the head 53 abuts the plug 44 to limit the movement of the rod 34.

If desired, additional safety stops may be provided. One such stop may be in the form of a depending leg 57 (FIG. 3) of a bracket 58 bolted to the underside of an overhanging arm 59 on the spindle housing 13. The leg 57 is in position to be engaged by a radial flange 60 on the enlargement 51 of the rod 34 and stop further movement of the rod. Alternatively, if the center 30 is mounted at a position remote from the arm 59, a chain (not shown) may have one end anchored to the frame of the machine and the other end hooked through a hole 61 (FIG. 4) in the head 53.

With the arrangement described above, the pressure regulator 32 is set at a pressure suitable for the workpiece being made, for example, 25 p.s.i., and the pressure in the cylinder 36 will remain steady at this pressure. Thus, the center 30 will engage the workpiece with a preselected force and this force will remain the same as the tool head 10 continues to move toward the work head 12. At no time is this force either too small or too great to prevent proper centering of the work.

I claim

1. In a machine tool having a work head and a tool head and means for moving said heads relatively toward and away from each other, the combination of, a conical centering member mounted on said tool head with its axis parallel to the path of relative movement of said heads and adapted to engage and center a workpiece mounted on said work head as said heads are moved relatively toward each other into positions spaced a predetermined distance from each other, said centering member being mounted on said tool head for axial movement relative to the tool head and being fixed against movement relative to said work head whereby to permit said heads to move further toward each other as work is performed on said workpiece, and means acting upon said centering member to hold the latter against the workpiece with a substantially constant force, said means comprising a cylinder, a piston slidable in said cylinder, a source of pressure fluid communicating with said cylinder, and a pressure regulator interposed between said source and said cylinder to maintain a selected pressure in said cylinder.

2. Apparatus as defined in claim 1 in which said cylinder is mounted on said tool head and said centering member is connected to said piston.

3. Apparatus as defined in claim 2 in which said piston is held against turning relative to said cylinder and including means connecting said member and said piston and supporting the member to turn relative to the piston.

4. In a machine tool having a work head and a tool head and means for moving said tool head relatively toward and away from said work head from a position spaced a predetermined distance from said work head, the combination of, a conical centering member mounted on said tool head with its axis parallel to the path of relative movement of said heads and adapted to engage and center a workpiece mounted on said work head when said tool head is in said position, said centering member being mounted on said tool head for axial movement relative thereto while remaining fixed against movement relative to said work head to permit said tool head to move toward said work head from said position, and means acting upon said centering member to hold the latter against the workpiece with a substantially constant force as said tool head moves from said position toward said work head, said means comprising a cylinder, a piston slidable in said cylinder, a source of pressure fluid communicating with said cylinder, and a pressure regulator interposed between said source and said cylinder to maintain a selected pressure in said cylinder.

5. A machine tool including a support, an indexable work head mounted on said support, a plurality of rotatable spindles mounted on said work head at angularly spaced positions for holding workpieces to be worked upon, a tool head mounted on said support and carrying a plurality of tools axially aligned with said spindles to perform work on said workpieces, means for moving said tool head relatively toward and away from said work head to engage and disengage said tools with said workpieces at a position spaced a predetermined distance from said work head, said tools performing work on said workpieces as said tool head moves toward said work head from said position, a forming tool mounted on said support adjacent one of said spindles and movable radially relative to the axis of the one spindle to engage the workpiece held by said one spindle coincident with the movement of the tool head from said position and toward the work head thereby to perform a turning operation on the one workpiece concurrently with the work performed on the other workpieces, a conical centering member mounted on said tool head with its axis parallel to the path of relative movement of said heads and aligned with the axis of said one spindle, said member being adapted to engage and center the workpiece held by said one spindle as said tool head moves toward said work head and into said position, said member further being mounted on said tool head for axial movement relative thereto as said tool head moves toward said work head from said position to remain fixed against movement relative to said work head to keep said workpiece centered against radial movement when worked upon by said forming tool, and means acting upon said centering member to hold the latter against the workpiece with a substantially constant force as said tool head moves from said position toward said work head, said means comprising a cylinder, a piston slidable in said cylinder, a source of pressure fluid communicating with said cylinder, and a pressure regulator interposed between said source and said cylinder to maintain a selected pressure in said cylinder.

* * * * *